US012387402B2

(12) United States Patent
He et al.

(10) Patent No.: US 12,387,402 B2
(45) Date of Patent: Aug. 12, 2025

(54) SYSTEM AND METHOD FOR LOCALIZED TEXT TO IMAGE GENERATION FOR FREE VIA CROSS ATTENTION

(71) Applicants: Robert Bosch GmbH, Stuttgart (DE); Carnegie Mellon University, Pittsburgh, PA (US)

(72) Inventors: Yutong He, Pittsburgh, PA (US); Ruslan Salakhutdinov, Pittsburgh, PA (US); Jeremy Kolter, Pittsburgh, PA (US); Marcus Pereira, Pittsburgh, PA (US); João D. Semedo, Pittsburgh, PA (US); Bahare Azari, San Jose, CA (US); Filipe J. Cabrita Condessa, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 257 days.

(21) Appl. No.: 18/208,075

(22) Filed: Jun. 9, 2023

(65) Prior Publication Data
US 2024/0412428 A1 Dec. 12, 2024

(51) Int. Cl.
*G06T 11/60* (2006.01)
*G06F 16/432* (2019.01)
(Continued)

(52) U.S. Cl.
CPC ............ *G06T 11/60* (2013.01); *G06F 16/432* (2019.01); *G06F 16/438* (2019.01);
(Continued)

(58) Field of Classification Search
CPC ........ G06T 11/60; G06F 40/40; G06F 16/438; G06F 40/284; G06N 3/0455; G06N 3/0464; G06N 3/0475
See application file for complete search history.

(56) References Cited

U.S. PATENT DOCUMENTS

| 11,972,218 B1* | 4/2024 | Huang ................... G06N 3/048 |
| 2023/0161978 A1* | 5/2023 | Sehanobish .............. G06N 3/09 704/9 |

(Continued)

OTHER PUBLICATIONS

Omer Bar-Tal et al., "MultiDiffusion: Fusing Diffusion Paths for Controlled Image Generation." arXiv:2302.08113v1 [cs.CV] Feb. 16, 2023, 16 Pages.

(Continued)

*Primary Examiner* — Jin Cheng Wang
(74) *Attorney, Agent, or Firm* — Dickinson Wright PLLC

(57) ABSTRACT

A method discloses receiving, at a cross-attention layer of a model, first text data describing a first object and second text data describing a first scene, wherein the first text data includes a description of a location of the first object, utilizing the model with cross-attention layers, concatenating the first text data and the second text data to generate a prompt; generating, a broadcasted location mask constructed from at least the location; generating, a broadcasted all-one matrix associated with the second text data described the first scene; computing a key matrix and a value matrix utilizing separate linear projections of the prompt; computing a query matrix utilizing linear projections; generating a broadcasted location matrix in response to concatenating the broadcasted location mask and the broadcasted all-one matrix; generating a cross-attention map utilizing the query matrix, the key matrix, and the broadcasted location matrix; and outputting a final image.

20 Claims, 3 Drawing Sheets

(51) Int. Cl.
G06F 16/438 (2019.01)
G06F 40/284 (2020.01)
G06F 40/40 (2020.01)
G06N 3/0475 (2023.01)

(52) U.S. Cl.
CPC ............ *G06F 40/284* (2020.01); *G06F 40/40* (2020.01); *G06N 3/0475* (2023.01)

(56) References Cited

U.S. PATENT DOCUMENTS

| | | | |
|---|---|---|---|
| 2023/0350936 A1* | 11/2023 | Alayrac | G06N 3/045 |
| 2024/0104353 A1* | 3/2024 | Leblond | G06N 5/01 |
| 2024/0281924 A1* | 8/2024 | Park | G06T 3/4053 |
| 2024/0331416 A1* | 10/2024 | Hu | G06V 10/7715 |
| 2024/0362842 A1* | 10/2024 | Ravi | G06T 5/70 |
| 2024/0380949 A1* | 11/2024 | Yang | H04N 21/23892 |
| 2024/0386634 A1* | 11/2024 | Brown | G06T 11/60 |
| 2024/0404144 A1* | 12/2024 | Aggarwal | G06N 3/045 |

OTHER PUBLICATIONS

Mikołaj Binkowski et al., "Demystifying MMD GANS." Published as a conference paper at ICLR 2018, 36 Pages.
Website, "Semantic segment anything (SSA)." https://github.com/326 fudan-zvg/Semantic-Segment-Anything, 2023, 10 Pages.
Marius Cordts et al., "The Cityscapes Dataset for Semantic Urban Scene Understanding." Proc. of the 329 IEEE Conference on Computer Vision and Pattern Recognition (CVPR), 2016, pp. 3213-3223.
Prafulla Dhariwal et al. "Diffusion Models Beat GANs on Image Synthesis." 35th Conference on Neural Information Processing Systems (NeurIPS 2021), 15 Pages.
Weixi Feng et al., "Training-Free Structured Diffusion Guidance for Compositional Text-to-Image Synthesis." arXiv:2212.05032v1 [cs.CV] Dec. 9, 2022, 19 Pages.
Ian J. Goodfellow et al., "Generative Adversarial Nets." Advances in Neural Information Processing Systems 2014, vol. 27, 9 Pages.
Amir Hertz et al., "Prompt-to-Prompt Image Editing with Cross Attention Control." arXiv:2208.01626v1 [cs.CV] Aug. 2, 2022, 19 Pages.
Jonathan Ho et al., "Denoising Diffusion Probabilistic Models." arXiv:2006.11239v2 [cs.LG] Dec. 16, 2020, 25 Pages.
Phillip Isola et al., "Image-to-Image Translation with Conditional Adversarial Networks." CVPR, 2017, pp. 1125-1134.
Website, Glenn Jocher et al., "YOLO by Ultralytics." Jan. 2023, 4 Pages. https://github.com/ultralytics/ultralytics.
Minguk Kang et al., "Scaling up GANs for Text-to-Image Synthesis." Proceedings of the IEEE Conference on Computer Vision and Pattern Recognition (CVPR), 2023, pp. 10124-10134.
Tero Karras et al., "A Style-Based Generator Architecture for Generative Adversarial Networks." arXiv:1812.04948v1 [cs.NE] Dec. 12, 2018, 12 Pages.
Diederik P. Kingma et al., "Auto-Encoding Variational Bayes." arXiv:1312.6114v11 [stat.ML] Dec. 10, 2022, 14 Pages.
Alexander Kirillov et al., "Segment Anything." arXiv:2304.02643v1 [cs.CV] Apr. 5, 2023, 30 Pages.
Liunian Harold Li et al., "Grounded Language-Image Pre-training." arXiv:2112.03857v2 [cs.CV] Jun. 17, 2022, 20 Pages.
Yuheng Li et al., "GLIGEN: Open-Set Grounded Text-to-Image Generation." CVPR, 2023, pp. 22511-22521.
Tsung-Yi Lin et al., "Microsoft COCO: Common Objects in Context." arXiv:1405.0312v3 [cs.CV] Feb. 21, 2015, 15 Pages.
Nan Liu et al., "Compositional Visual Generation with Composable Diffusion Models." Computer Vision-ECCV 2022: 17th European Conference, Tel Aviv, Israel, Oct. 23-27, 2022, Proceedings, Part XVII, 17 Pages.
Chenlin Meng et al., "SDEDIT: Guided Image Synthesis and Editing With Stochastic Differential Equations." Published as a conference paper at ICLR 2022, 33 Pages.
Mehdi Mirza et al., "Conditional Generative Adversarial Nets." arXiv:1411.1784v1 [cs.LG] Nov. 6, 2014, 7 Pages.
Alex Nichol et al., "GLIDE: Towards Photorealistic Image Generation and Editing with Text-Guided Diffusion Models." arXiv:2112.10741v3 [cs.CV] Mar. 8, 2022, 20 Pages.
Taesung Park et al., "Semantic Image Synthesis with Spatially-Adaptive Normalization." Proceedings of the IEEE Conference on Computer Vision and Pattern Recognition, 2019, pp. 2337-2346.
Aditya Ramesh et al., "Zero-Shot Text-to-Image Generation." arXiv:2102.12092v2 [cs.CV] Feb. 26, 2021, 20 Pages.
Robin Rombach et al., "High-Resolution Image Synthesis with Latent Diffusion Models." arXiv:2112.10752v1 [cs.CV] Dec. 20, 2021, 45 Pages.
Chitwan Saharia et al., "Photorealistic Text-to-Image Diffusion Models with Deep Language Understanding." 36th Conference on Neural Information Processing Systems (NeurIPS 2022), 16 Pages.
Jascha Sohl-Dickstein et al., "Deep Unsupervised Learning using Nonequilibrium Thermodynamics." arXiv:1503.03585v8 [cs.LG] Nov. 18, 2015, 18 Pages.
Wei Sun et al., "Image Synthesis From Reconfigurable Layout and Style." arXiv: 1908.07500v1 [cs.CV] Aug. 20, 2019, 10 Pages.
Tristan Thrush et al., "Winoground: Probing Vision and Language Models for Visio-Linguistic Compositionality." CVPR, 2022, pp. 5238-5248.
Omer Tov et al., "Designing an Encoder for StyleGAN Image Manipulation." arXiv:2102.02766v1 [cs.CV] Feb. 4, 2021, 33 Pages.
Bo Zhao et al., "Image Generation from Layout," arXiv:1811.11389v3 [cs.CV] Oct. 14, 2019, 10 Pages.

* cited by examiner

SYSTEM AND METHOD FOR LOCALIZED TEXT TO IMAGE GENERATION FOR FREE VIA CROSS ATTENTION

TECHNICAL FIELD

The present disclosure relates to image generation utilizing a machining learning network, such as a text to image generation system.

BACKGROUND

Text-to-image generative models have shown strong performance in recent years. Such models like Stable Diffusion and Dall-E are capable of generating high quality and diverse images from arbitrary text prompts. However, a significant challenge faced by these models is that they rely solely on text prompts alone for content control over the generation process, which may be inadequate for many applications. Specifically, one of the most intuitive and user-friendly ways to exert control over the generation is to provide localization information, which guides the models on where to generate specific elements within the image. Unfortunately, current pretrained models face limitations in their capability to perform localized generation. These limitations arise not only from their inability to incorporate location information as input, but also from the inherent difficulties associated with compositionality, which is a known challenge for many multimodal foundation models.

Existing methods addressing this issue typically fall into three main categories: training entirely new models, fine-tuning existing models with additional components such as task-specific encoders, or strategically combining multiple samples into one. These approaches may often demand a substantial amount of training data, resources, and/or extended inference time, rendering them impractical for real-life applications due to their time and resource-intensive nature. On the other hand, Prompt-to-Prompt Image Editing may edit generated images based on modified text prompts by manipulating cross attention maps in text-to-image generative models. Notably, this work also shows that cross attention layers play a pivotal role in controlling the spatial layout of generated objects associated with specific phrases in the prompts.

SUMMARY

According to a first embodiment, a computer-implemented method of generating synthetic image data discloses receiving, at a cross-attention layer of a pre-trained model including an input to the-pretrained model, an first text data describing a first object and a second text data describing a first scene, wherein the first text data includes a description of a location of the first object. The method also includes utilizing the pretrained model with cross-attention layers, concatenating the first text data and the second text data to generate a single prompt describing the first text data and the second text data, generating, utilizing the first text data, a broadcasted location mask constructed from at least the location of the first object indicating pixels associated with the first object, generating, utilizing the second text data, a broadcasted all-one matrix associated with the second text data described the first scene, wherein the broadcasted all-one matrix is a mask that includes all pixels associated with the first scene, computing a key matrix and a value matrix utilizing separate linear projections of the single prompt, computing a query matrix utilizing linear projections of either (i) an output of a previous layer or (ii) the input to the pretrained model, generating a broadcasted location matrix in response to concatenating the broadcasted location mask and the broadcasted all-one matrix, generating a cross-attention map utilizing the query matrix, the key matrix, and the broadcasted location matrix, and outputting a final image in response to executing a fixed number of iterations corresponding to the cross-attention layers of the pre-trained model.

According to a second embodiment, a computer-implemented method discloses receiving, at a cross-attention layer of a model, first text data describing a first object and second text data describing a first scene, wherein the first text data includes a description of a location of the first object; utilizing the model with cross-attention layers, concatenating the first text data and the second text data to generate a prompt describing the first text data and the second text data; generating, utilizing the first text data, a broadcasted location mask constructed from at least the location of the first object indicating pixels associated with the first object; generating, utilizing the second text data, a broadcasted all-one matrix associated with the second text data described the first scene, wherein the broadcasted all-one matrix is a mask that includes all pixels associated with the first scene; computing a key matrix and a value matrix utilizing separate linear projections of the prompt; computing a query matrix utilizing linear projections of either (i) an output of a previous layer or (ii) the input to the pretrained model; generating a broadcasted location matrix in response to concatenating the broadcasted location mask and the broadcasted all-one matrix; generating a cross-attention map utilizing the query matrix, the key matrix, and the broadcasted location matrix; and outputting, from a final layer of the model, a final image in response to executing a fixed number of iterations.

According to a third embodiment, A system includes an input interface configured to receive a query; and a processor in communication with the input interface, the processor programmed to: receive, at a cross-attention layer of a pre-trained model including an input to the-pretrained model, an first text data describing a first object and a second text data describing a first scene, wherein the first text data includes a description of a location of the first object, utilizing the pretrained model with cross-attention layers, concatenate the first text data and the second text data to generate a single prompt describing the first text data and the second text data; generate, utilizing the first text data, a broadcasted location mask constructed from at least the location of the first object indicating pixels associated with the first object; generate, utilizing the second text data, a broadcasted all-one matrix associated with the second text data described the first scene, wherein the broadcasted all-one matrix is a mask that includes all pixels associated with the first scene; determine a key matrix and a value matrix utilizing separate linear projections of the single prompt; determine a query matrix utilizing linear projections of either (i) an output of a previous layer or (ii) the input to the pretrained model; generate a broadcasted location matrix in response to concatenating the broadcasted location mask and the broadcasted all-one matrix; generate a cross-attention map utilizing the query matrix, the key matrix, and the broadcasted location matrix; and output a final image in response to executing a fixed number of iterations corresponding to the cross-attention layers of the pre-trained mode.

DETAILED DESCRIPTION

In one embodiment, the system and method proposes to use cross attention control (CAC) to provide pretrained text-to-image models with better open-vocabulary localization abilities. Given a caption and localization information, such as bounding boxes and semantic segmentation maps, along with their corresponding text descriptions, a system may first construct a new text input by concatenating the caption and all prompts associated with the location information. The system may then compute the cross attention maps from this new text prompt and apply localization constraints to the cross attention maps according to the localization information. Such a method does not require any additional training or model architecture modification like designing task-specific encoders. It also does not impose any language restrictions, such as using a fixed set of vocabulary or a language parser. Moreover, it is highly portable and can be easily integrated into a single forward pass in any cross attention based text-to-image generation framework with only a few lines of code, thus demanding no extra inference time.

Figure 1:
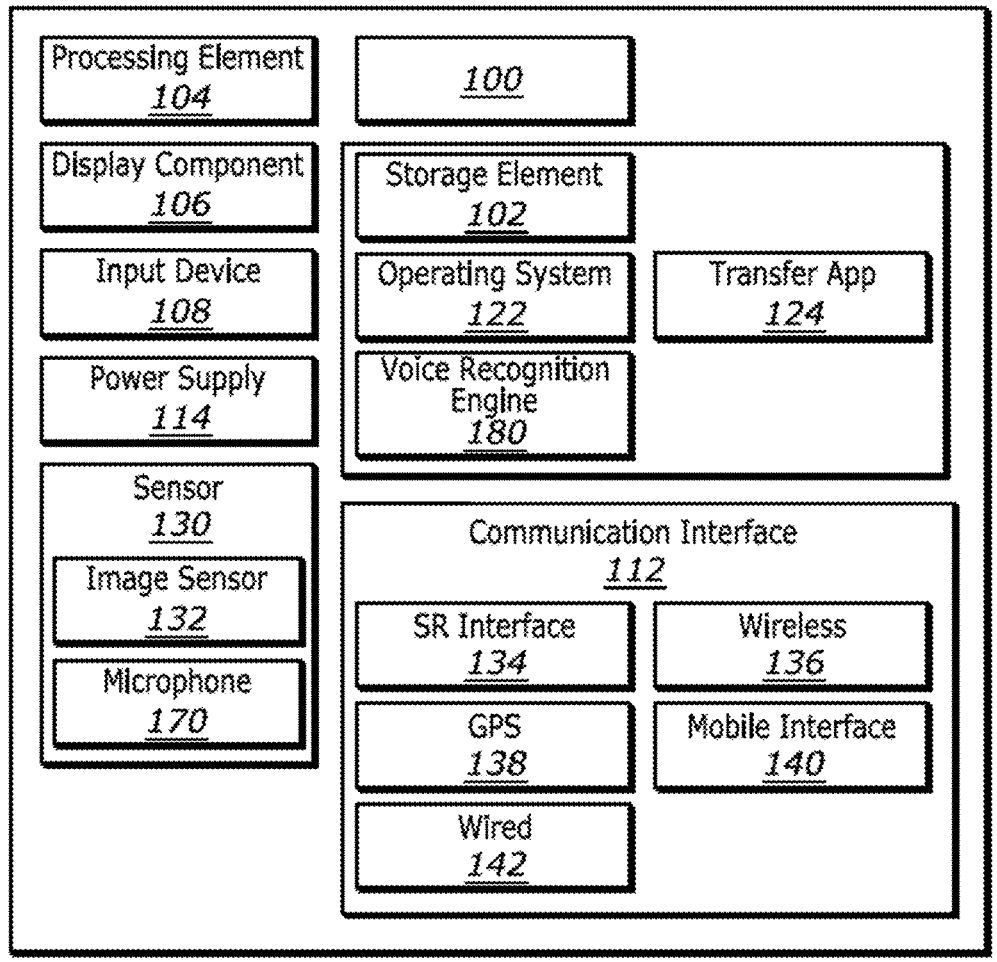
FIG. 1 illustrates an embodiment of a block diagram showing an example architecture of a computing device, such as the camera devices, processors, mobile devices, and other computing devices described herein.

FIG. 1 illustrates an embodiment of a block diagram showing an example architecture of a computing device, such as the camera devices, processors, mobile devices, and other computing devices described herein. It will be appreciated that not all user devices will include all of the components of the architecture 100 and some user devices may include additional components not shown in the architecture 100. The architecture 100 may include one or more processing elements 104 for executing instructions and retrieving data stored in a non-transitory, computer-readable storage element 102. The processing element 104 may comprise at least one processor. Any suitable processor or processors may be used. For example, the processing element 104 may comprise one or more digital signal processors (DSPs) and/or image signal processors (ISPs). In some examples, the processing element 104 may be effective to perform one or more functions of generators and/or discriminators, as described above. The storage element 102 can include one or more different types of non-transitory, computer-readable memory, data storage, or computer-readable storage media devoted to different purposes within the architecture 100. For example, the storage element 102 may comprise flash memory, random-access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive images and/or video from another device (e.g., a mobile device, image capture device, and/or display device) or from an image sensor 132 included in the architecture 100. In some examples, the transfer application 124 may also be configured to upload the received images to another device that may perform processing as described herein (e.g., a mobile device and/or another computing device).

When implemented in some user devices, the architecture 100 may also comprise a display component 106. The display component 106 may comprise one or more light-emitting diodes (LEDs) or other suitable display lamps. Also, in some examples, the display component 106 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. In some examples, architecture 100 may include a microphone 170 for capturing sounds, such as voice commands. Voice recognition engine 180 may interpret audio signals of sound captured by microphone 170. In some examples, voice recognition engine 180 may listen for a "wake word" to be received by microphone 170. Upon receipt of the wake word, voice recognition engine 180 may stream audio to a voice recognition server for analysis. In various examples, voice recognition engine 180 may stream audio to external computing devices via communication interface 112.

When the display component 106 includes a touch-sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The communication interface 112 may comprise one or more wired or wireless components operable to communicate with one or more other user devices. For example, the communication interface 112 may comprise a wireless communication module 136 configured to communicate on a network, according to any suitable wireless protocol, such as IEEE 802.11 or another suitable wireless local area network (WLAN) protocol. A short range interface 134 may be configured to communicate using one or more short range wireless protocols such as, for example, near field communications (NFC), Bluetooth, Bluetooth LE, etc. A mobile interface 140 may be configured to communicate utilizing a cellular or other mobile protocol. A Global Positioning System (GPS) interface 138 may be in communication with one or more earth-orbiting satellites or other suitable position-determining systems to identify a position of the architecture 100. A wired communication module 142 may be configured to communicate according to the USB protocol or any other suitable protocol. In various examples, mobile interface 140 may allow computing device(s) to communicate with one or more other computing devices that may be used to perform various aspects of the techniques described herein.

The architecture 100 may also include one or more sensors 130 such as, for example, one or more position sensors, image sensors, and/or motion sensors. An image sensor 132 may be shown. Some examples of the architecture 100 may include multiple image sensors 132. For example, a panoramic camera system may comprise multiple image sensors 132 resulting in multiple images and/or video frames that may be stitched and may be blended to form a seamless panoramic output. An example of an image sensor 132 may be a camera or other image sensor. In various examples, image sensor 132 may be configured to capture color information, IR image data, image geometry information, and/or ambient light information.

Motion sensors may include any sensors that sense motion of the architecture including, for example, gyro sensors and accelerometers. Motion sensors, in some examples, may be used to determine an orientation, such as a pitch angle and/or a roll angle, of a camera. A gyro sensor may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. In some examples, an accelerometer may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. As described, in some examples, image sensor 132 may be effective to detect infrared light. In at least some examples, architecture 100 may include an infrared light source to illuminate the surrounding environment.

Figure 2:
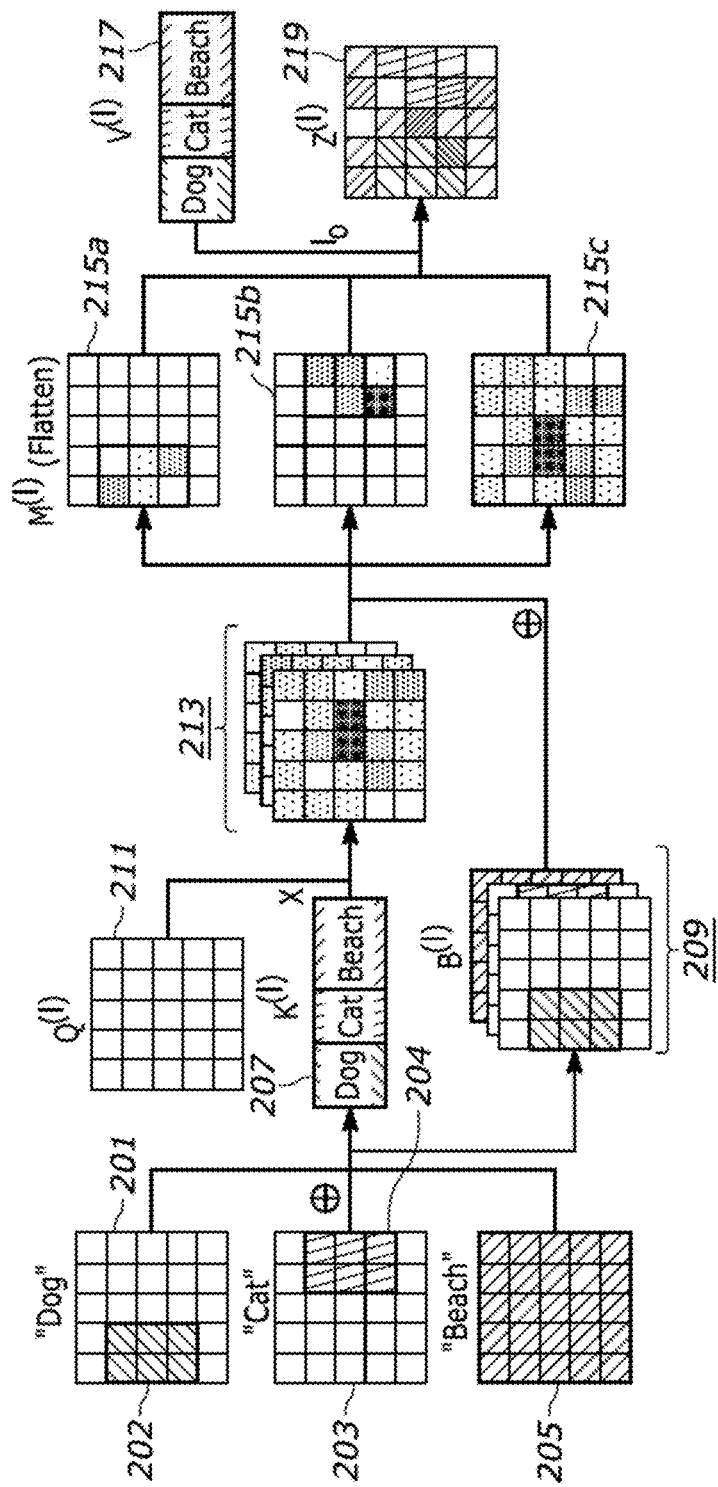
FIG. 2 illustrates an embodiment of a process utilizing text-to-image generation with cross attention control (CAC).

FIG. 2 discloses an illustration of a process utilizing text-to-image generation with cross attention control (CAC). The system may utilize a standardized suite of evaluation metrics for localized text-to-image generation tasks using off-the-shelf large pretrained recognition models. The system may apply CAC to various state-of-the-art baseline text-to-image generative models and experiment with different forms of localization information including bounding boxes and semantic segmentation maps. The system and method may demonstrate that CAC endows pretrained standard text-to-image models with new localized generation abilities, and furthermore, improves upon models specifically trained for localized generation. In addition, the embodiments may show that with simple heuristics that spatially separate the components within text prompts, the method can significantly improve the compositional ability of text-to-image generative models.

The goal of this work is to perform localized text-to-image generation given pretrained text-to-image generative models. The localization information provided by the users should consist of text phrases that describe the contents and the constrained spatial locations associated with these contents in the image space. Common location information includes bounding boxes and semantic segmentation maps. Moreover, the system may aim at performing this task with (1) no additional training or fine-tuning (2) no model architecture modification and (3) no extra inference time (4) no further limitation on the input text space from the original model. The provided pretrained models can either be trained with localization information, or solely trained with the text-image pairs.

Formally, given a pretrained text-to-image generative model $p_\theta$, a length $\eta_0$ text prompt $y_0 \in Y^{n0}$ and a set of localization information $g=\{g_i\}_{i=1}^m$, one goal may be to generate an image $x \in \mathcal{X} \subset \mathbb{R}^{C \times H \times W} \sim p_\theta(x|y_0, g)$ that is visually consistent with the overall textual description provided in $y_0$ and the localized description provided in g. Here Y represents the vocabulary space of the text prompt, C, H, W are the dimensionalities of the output images, and for each $i \in \{1, \ldots, m\}$, $g_i=(y_i, b_i) \in Y^{ni} * [0, 1]^{H*W}$ where $y_i$ is the textual description of the i-th localized region and $b_i$ is the spatial constraint mask corresponding to that description. The pretrained model $p_\theta$ can either sample from $p_\theta(x|y_0)$ or $p_\theta(x|y_0, g)$. The system may assume the pretrained models use cross attention mechanism for the text-image conditioning.

State-of-the-art text-to-image generative models may achieve their success with cross attention mechanism. In one embodiment, the system may choose Stable Diffusion as the backbone model. However, alternative embodiments may allow for a system and method that can also be applied to other cross attention based diffusion models such as Imagen and GANs such as GigaGAN.

For the task of sampling from $x \in p_\theta(x|y_0)$ where $x \in X$, $y_0 \in Y^n$, a cross attention layer l in $p_\theta$ receives an encoded text prompt $e_{yo} \in \mathbb{R}$ and an intermediate sample $z^{(<l)} \in \mathbb{R}$ that has been processed by previous layers in the network and previous diffusion timesteps as its inputs. For example, no, de are the text length and text embedding dimension, and $C^{(l)}$, $H^{(l)}$, $W^{(l)}$ represent the perceptive dimensions of layer l, which can be different from C', H', W' because of the U-Net structure. The system may then project $z^{(<l)}$ into a query matrix 211 $K_0^{(l)} = l_K(e_{yo}) \in \mathbb{R}$, $V_0^{(l)} = l_V(e_{yo}) \in \mathbb{R}$. h is the number of heads for multi-head attention, d is the feature projection dimension of query 211 and key 207 and $d_v$ is that of the value. The cross attention map at layer l is then calculated to be:

$$M_o^{(l)} = \text{Softmax}\left(\frac{Q^{(l)} K_0^{(l)T}}{\sqrt{d}}\right) \in \mathbb{R}^{h \cdot (H^{(l)} * W^{(l)}) * n_0}$$

$z^{(l)} = l_O(M_0^{(t)} V_0^{(t)}) \in \mathbb{R}$ is the output of l where $l_O$ is another linear projection.

The system can interpret each entry $M_{0,(r,j,k)}^l$ in $M_0^{(l)}$ as the extent of attention the r-th head pays to the k-th token in $y_0$ when generating the j-th pixel block in the image. The layer output is the weighted average of the value features, where the weights are assigned by the attention maps from all heads.

In one example, a prompt 201 may include a text description ("dog") and with an indicator of a location 202 associated with the first prompt as applied to a matrix or map. A second prompt 203 may include a description "cat" and show a location 204 associated with the first prompt as pertaining to the object. Another prompt 205 may indicate a scene.

Each localization information pair $g_i=(y_i, b_i)$ indicates that the model should generate contents that can be described by text prompt $y_i$ at pixel locations where $b_i > 0$. Therefore, based on the previous interpretation and discovery, the (r,j,k)-th element in the attention map should only receive attention from the k-th token in $y_i$ if the j=th entry $b_{i,(j)}$ in the spatial constraint mask $b_i$ is positive.

As a result, the system may first interpolate the original location mask $b_i$ to obtain $b_i^{(l)} \in H^{(l)} * W^{(l)}$ that match dimensionality of the perceptive field of layer l. Let $B_i^{(l)} \in h*(H^{(l)}*W}$ $^{(l)*n}$ denote the flattened and broadcasted location mask 209 constructed from $b_i^{(l)}$ and $K_i^{(l)} = 1_K(e_{y_i}) \in \mathbb{R}$ denote the key matrix 207 calculated from $y_i$, which can extend Equation 1 to have:

$$M_i^{(l)} = \text{Softmax}\left(\frac{Q^{(l)}K_i^{(l)T}}{\sqrt{d}}\right) \odot B_i^{(l)} \in \mathbb{R}^{h*(H^{(l)}*W^{(l)})*n_i}$$

The system may then combine the m+1 attentions maps $$\{M_i^{(l)}\}_{i=0}^m 3$$

in one example. In one example, the attention maps 215a, 215b, 215c, may be generated. In one embodiment, the system may calculate the average map $$\overline{M^{(l)}} = \frac{1}{m+1}\sum_{i=1}^m M_i^{(l)}.$$

However, it is unclear what is the "average" value matrix 217 corresponding to this attention map. Another attempt is to separately calculate the matrices $M_i^{(l)} V_i^{(l)}$ where $V_i^{(l)} = 1_V(e_{y_i})$, and then calculate the average output matrix $$\frac{1}{m+1}\sum_{i=0}^m l_O(M_i^{(l)} V_i^{(l)}) \text{ or } \frac{1}{m+1} l_O\left(\sum_{i=0}^m M_i^{(l)} V_i^{(l)}\right)$$

as the output of the layer. While it works well for their standard text to-image generation task, very sparse attention maps rendered by localization information associated with small objects in our setting can lead to unexpected behaviors.

The system may assume that $y_i$ is a substring of $y_0$ for all $i=1, \ldots, m$: For instance, if a user wants to generate "a photo of a dining room with cups on a dining table" and provides bounding boxes for the "cups" and the "dining table", then the system can directly mask the parts of the attention map for the caption (i.e. $M_0^{(l)}$) that are associated with the tokens for "cups" and "dining table" using the location information. Formally, suppose $y_i$ corresponds to the $j_{i\text{-}th}$ token to the $(j_i+n_i)$-th token in $y_0$, then the system can directly calculate:

$$M_i^{(l)} = M_0^{(l)} \odot B_{i,(j_i:j_i+n_i)}^{(l)}$$

Where $B_{i(j_i:j_i+n_i)}^{(l)}$ is the mask where $b_i^{(l)}$ is only broadcasted to the $j_i$-th to $(j_i+n_i)$-th submatrices in the third dimension while keeping the rest of the elements all zeros. Then the system may can calculate $$z^{(l)} = l_O\left(\left(\sum_{i=0}^m M_i^{(l)}\right) V_0^{(l)}\right).$$

However, this assumption may not hold all the time. For example, the user can request to generate "a photo of a dining room" without describing all the details of the scene, but they can still specify the locations of the "cups" and the "dining table" with bounding boxes without mentioning them in the caption. Therefore, to apply this method to all inputs without this assumption, the system can construct a new text prompt by concatenating all input prompts:

$$y = y_0 \oplus y_1 \oplus \cdots \oplus y_m$$

Where $\oplus$ denotes concatenation. In one embodiment, the system and the method may keep all the special tokens from encoding and pad the resulting prompt after concatenation. Similar to the text prompts, the system may also concatenate all masks to create:

$$B^{(l)} = B_0^{(l)} \oplus B_1^{(l)} \oplus \cdots \oplus B_m^{(l)} \in \mathbb{R}^{h*(H^{(l)}*W^{(l)})*(\sum_{i=0}^m n_i)}$$

The system and method may use all-one matrices 213 as the location masks for the caption $y_0$ and the special tokens in practice. Similar to Prompt-to-Prompt Editing, the system may also apply a separate set of weights $\lambda \in \mathbb{R}$ to the attention maps to adjust the effects of each token has to the resulting generation. With $K^l = 1_K(e_y) \in \mathbb{R}$, the system can calculate the aggregated attention map as $$M^{(l)} = \lambda \text{Softmax}\left(\frac{Q^{(l)}K^{(l)T}}{\sqrt{d}}\right) \odot B^{(l)} \in \mathbb{R}^{h*(H^{(l)}*W^{(l)})*(\sum_{i=0}^m n_i)}$$

Finally, the output of the layer 219 can be computed as $z^{(l)} = l_O(M^{(l)} V^{(l)})$, and the framework is illustrated in FIG. 2. The system and method may only change the forward pass of the pretrained model at sampling time and thus does not require any further training or model architecture modifications, and it does not demand any other language restrictions or priors, such as a fixed set of vocabulary or a language parser. It is also well packaged in the original optimized transformer framework and therefore requires no additional inference time. Because of the minimal assumption, our method is an open-vocabulary plugin for all text-to-image generative models that use cross attention for textual guidance at no extra cost.

In addition to cross attention, self-attention layers are also essential for many text-to-image generative models to produce coherent spatial layouts. For example, in addition to cross attention control, applying self-attention control to a small portion of the diffusion process can further help provide consistent geometry and color palettes. While self-attention control is trivial in editing, it becomes complicated in our setting since location information for different localization prompts can overlap with each other, resulting conflicting signals at the overlapping pixels and ambiguous masks.

One approach to incorporate self-attention control is to separately optimize each region according to different localization prompts before binding all regions together. When applying both self attention control and cross attention control to all diffusion steps, the solution to this may be roughly reduced to MultiDiffusion. As a result, the system may first apply MultiDiffusion to a small portion of the diffusion process, and then perform cross attention controlled diffusion as described above to the rest of the diffusion timesteps to obtain the desired effect. The system may also use models like GLIGEN that are fine-tuned on localization information to provide learned self attention control.

In one illustrative embodiment and method, the system may be considered a plugin for MultiDiffusion and GLIGEN to provide better localization ability, and it may do so without adding extra cost to the two algorithms.

Figure 3:
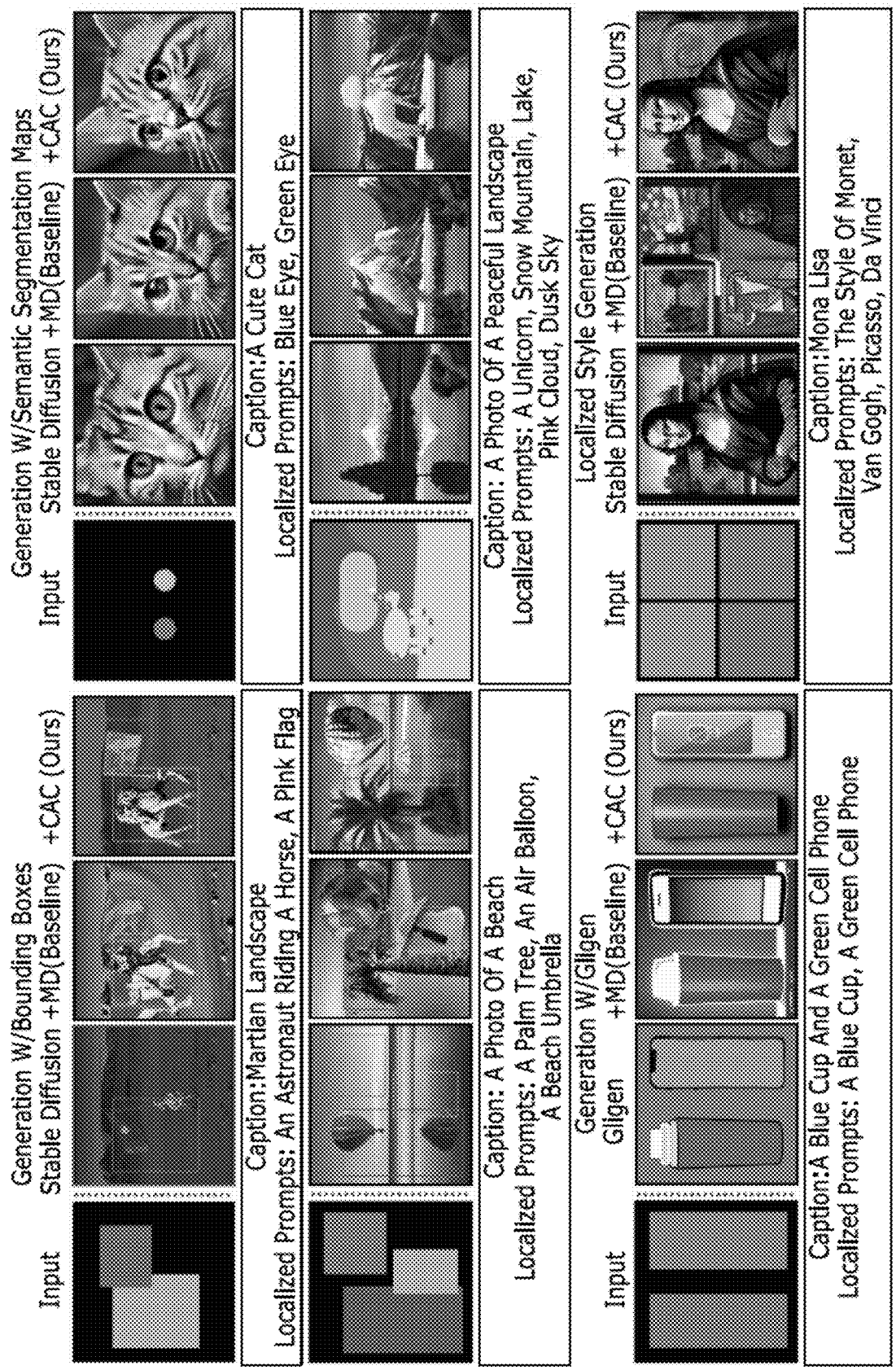
FIG. 3 illustrates examples of localized text-to-image generation utilizing illustrative embodiments.

FIG. 3 illustrates an example of cross-attention control as a plugin to existing methods for localized text-to-image generation. Cross-attention control may improve upon diverse types of localization (bounding boxes, semantic segmentation maps and localized styles) with different based models (e.g., Stable Diffusion and GLIGEN). As shown in FIG. 3, bounding boxes may be utilized as input. The bounding boxes may be reflective of the objects like "an astronaut riding a horse" and "a pink flag." A caption may indicate "Martian landscape" in one embodiment. The localized prompts may indicate 'an astronaut riding a horse" and "a pink flag" and correspond to the input. The bounding boxes may include a scene and objects associated with a scene. As shown in the CAC example, the placement of the "astronaut riding a horse" is more accurate than the baseline models. Additionally, the flag may be of appropriate shape and location.

In another example, the input may utilize semantic segmentation maps. The semantic segmentation maps may map out objects or augmented correspondingly to images. In one example, the semantic segmentation map may correspond to a cat with one eye that is blue and one eye that is green. The caption may be 'a cute cat." The localized prompt may be a "blue eye" and a "green eye." The cross attention control model may output a more accurate and higher quality image than the other versions. Of course, other examples are shown in FIG. 3.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of generating synthetic image data, comprising:
    receiving, at a cross-attention layer of a pre-trained model including an input to the-pretrained model, an first text data describing a first object and a second text data describing a first scene, wherein the first text data includes a description of a location of the first object;
    utilizing the pretrained model with cross-attention layers, concatenating the first text data and the second text data to generate a single prompt describing the first text data and the second text data;
    generating, utilizing the first text data, a broadcasted location mask constructed from at least the location of the first object indicating pixels associated with the first object;
    generating, utilizing the second text data, a broadcasted all-one matrix associated with the second text data described the first scene, wherein the broadcasted all-one matrix is a mask that includes all pixels associated with the first scene;
    computing a key matrix and a value matrix utilizing separate linear projections of the single prompt;
    computing a query matrix utilizing linear projections of either (i) an output of a previous layer or (ii) the input to the pretrained model;
    generating a broadcasted location matrix in response to concatenating the broadcasted location mask and the broadcasted all-one matrix;
    generating a cross-attention map utilizing the query matrix, the key matrix, and the broadcasted location matrix; and
    outputting a final image in response to executing a fixed number of iterations corresponding to the cross-attention layers of the pre-trained model.

2. The method of claim 1, wherein the cross-attention map is generated utilizing at least a softmax function.

3. The method of claim 1, wherein the cross-attention map is generated utilizing element-wise multiplication with the broadcasted location matrix and matrix multiplication of the query matrix and key matrix.

4. The method of claim 1, wherein the pre-trained models include at least stable diffusion model.

5. The method of claim 1, wherein the pretrained model includes one or more layers of cross-attention layers, wherein a first layer is configured to generate output sent to a second layer.

6. The method of claim 1, wherein a second iteration is configured to generate output sent to a third iteration.

7. The method of claim 1, wherein the cross-attention layers include a final layer that outputs the final image associated with the first text data and the second text data.

8. The method of claim 1, wherein the pre-trained model is configured to adjust effects that each token in response to weights associated with the cross-attention map.

9. The method of claim 1, wherein the method includes receiving a third text data describing a second object.

10. The method of claim 9, wherein the third text data describes a second location associated with the second object.

11. A computer-implemented method of generating synthetic image data, comprising:
receiving, at a cross-attention layer of a model, first text data describing a first object and second text data describing a first scene, wherein the first text data includes a description of a location of the first object;
utilizing the model with cross-attention layers, concatenating the first text data and the second text data to generate a prompt describing the first text data and the second text data;
generating, utilizing the first text data, a broadcasted location mask constructed from at least the location of the first object indicating pixels associated with the first object;
generating, utilizing the second text data, a broadcasted all-one matrix associated with the second text data described the first scene, wherein the broadcasted all-one matrix is a mask that includes all pixels associated with the first scene;
computing a key matrix and a value matrix utilizing separate linear projections of the prompt;
computing a query matrix utilizing linear projections of either (i) an output of a previous layer or (ii) the input to the pretrained model;
generating a broadcasted location matrix in response to concatenating the broadcasted location mask and the broadcasted all-one matrix;
generating a cross-attention map utilizing the query matrix, the key matrix, and the broadcasted location matrix; and
outputting, from a final layer of the model, a final image in response to executing a fixed number of iterations.

12. The method of claim 11, wherein the fixed number of iterations correspond to the cross-attention layers.

13. The method of claim 11, wherein model includes an input image model.

14. The method of claim 11, wherein the model is configured to adjust effects that each token in response to weights associated with the cross-attention map.

15. The method of claim 11, wherein the final image is associated with the first text data and the second text data.

16. The method of claim 11, wherein the method includes receiving a third text data describing a second object and a second location associated with the second object.

17. A system, comprising:
an input interface configured to receive a query; and
a processor in communication with the input interface, the processor programmed to:
receive, at a cross-attention layer of a pre-trained model including an input to the-pretrained model, an first text data describing a first object and a second text data describing a first scene, wherein the first text data includes a description of a location of the first object;
utilizing the pretrained model with cross-attention layers, concatenate the first text data and the second text data to generate a single prompt describing the first text data and the second text data;
generate, utilizing the first text data, a broadcasted location mask constructed from at least the location of the first object indicating pixels associated with the first object;
generate, utilizing the second text data, a broadcasted all-one matrix associated with the second text data described the first scene, wherein the broadcasted all-one matrix is a mask that includes all pixels associated with the first scene;
determine a key matrix and a value matrix utilizing separate linear projections of the single prompt;
determine a query matrix utilizing linear projections of either (i) an output of a previous layer or (ii) the input to the pretrained model;
generate a broadcasted location matrix in response to concatenating the broadcasted location mask and the broadcasted all-one matrix;
generate a cross-attention map utilizing the query matrix, the key matrix, and the broadcasted location matrix; and
output a final image in response to executing a fixed number of iterations corresponding to the cross-attention layers of the pre-trained model.

18. The system of claim 17, wherein the processor is programmed to receive a third text data describing a second object and a second location associated with the second object.

19. The system of claim 17, wherein the cross-attention map is generated utilizing at least a softmax function.

20. The system of claim 17, wherein the cross-attention map is generated utilizing element-wise multiplication with the broadcasted location matrix and matrix multiplication of the query matrix and key matrix.

* * * * *